UNITED STATES PATENT OFFICE.

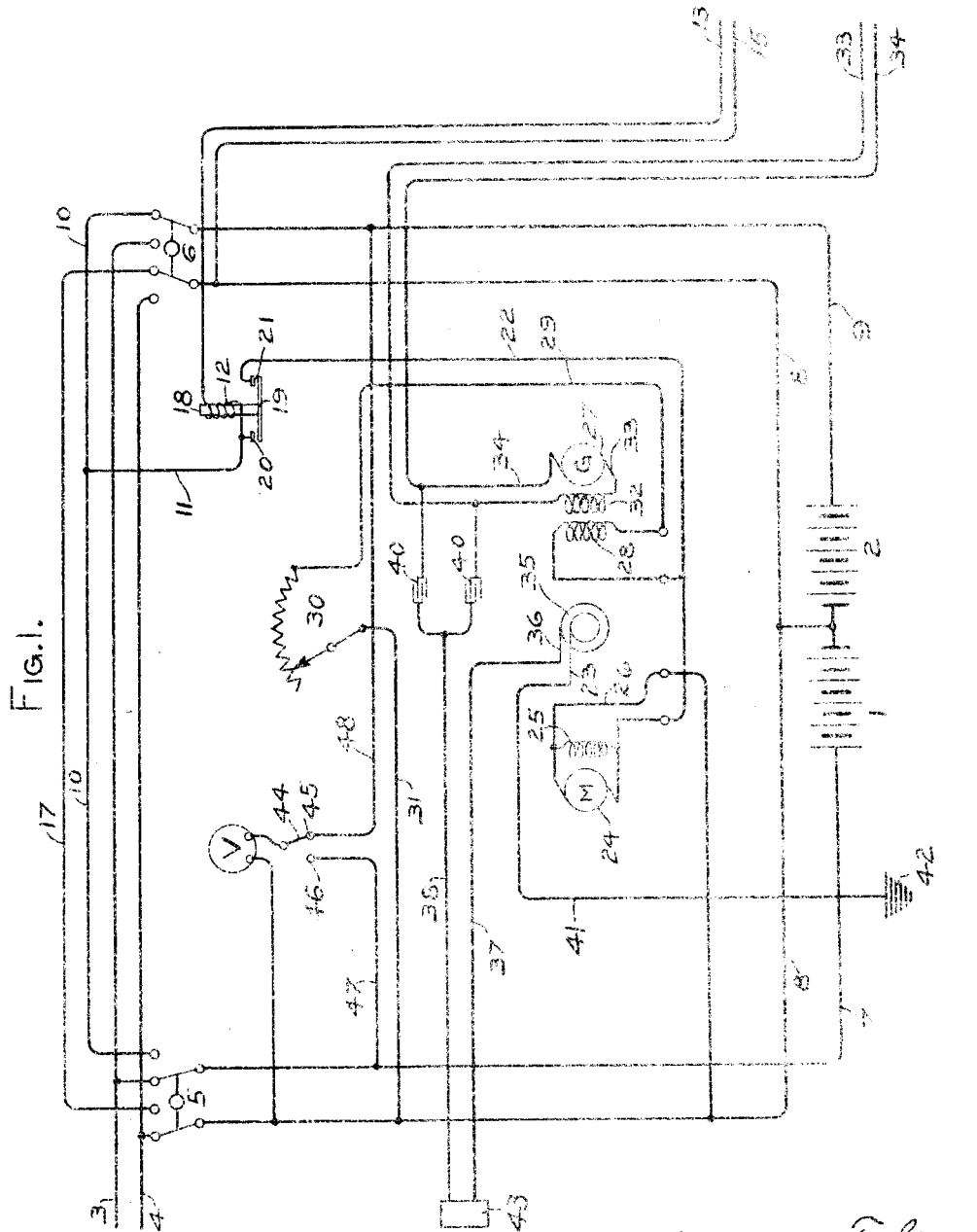

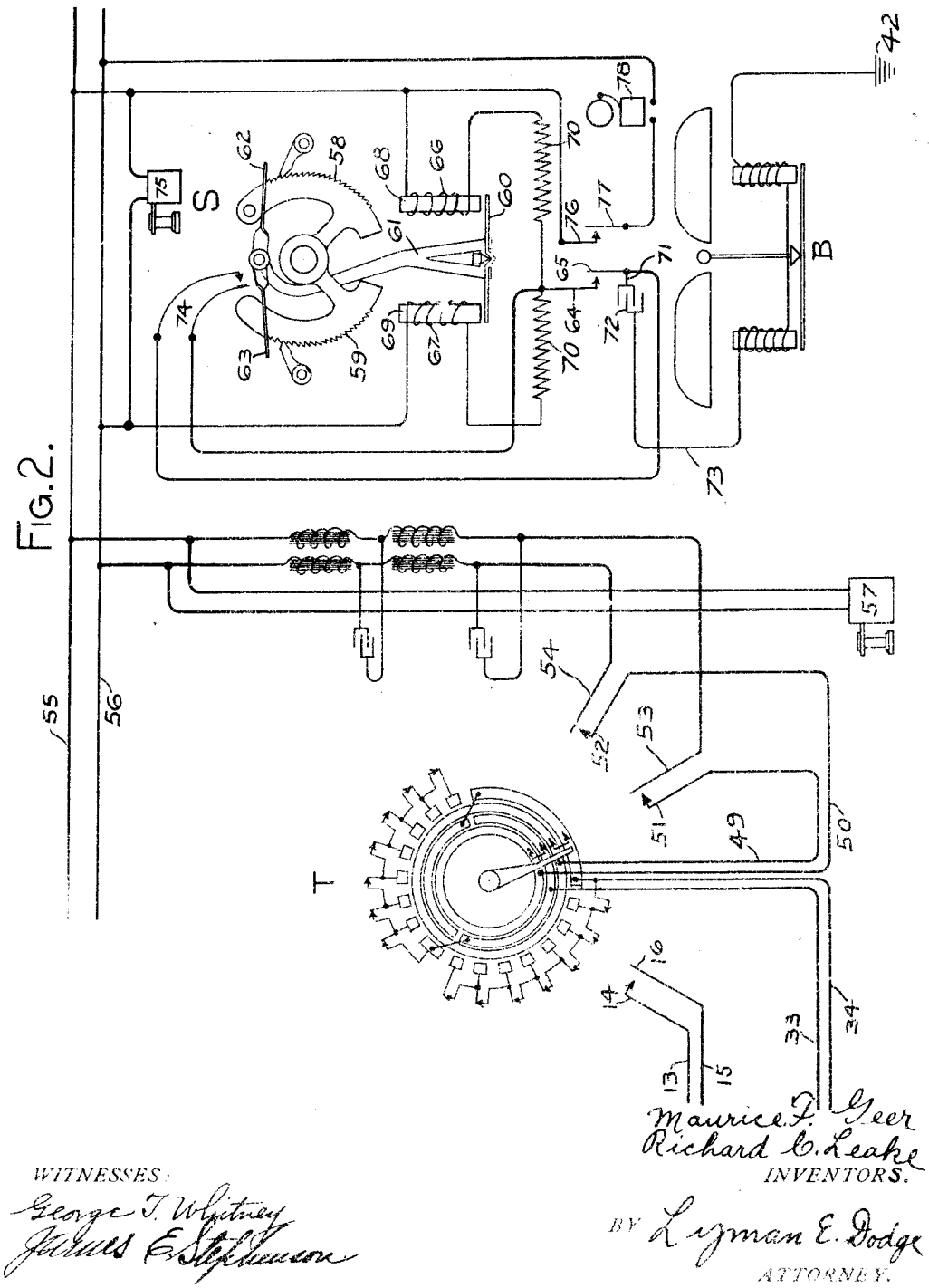

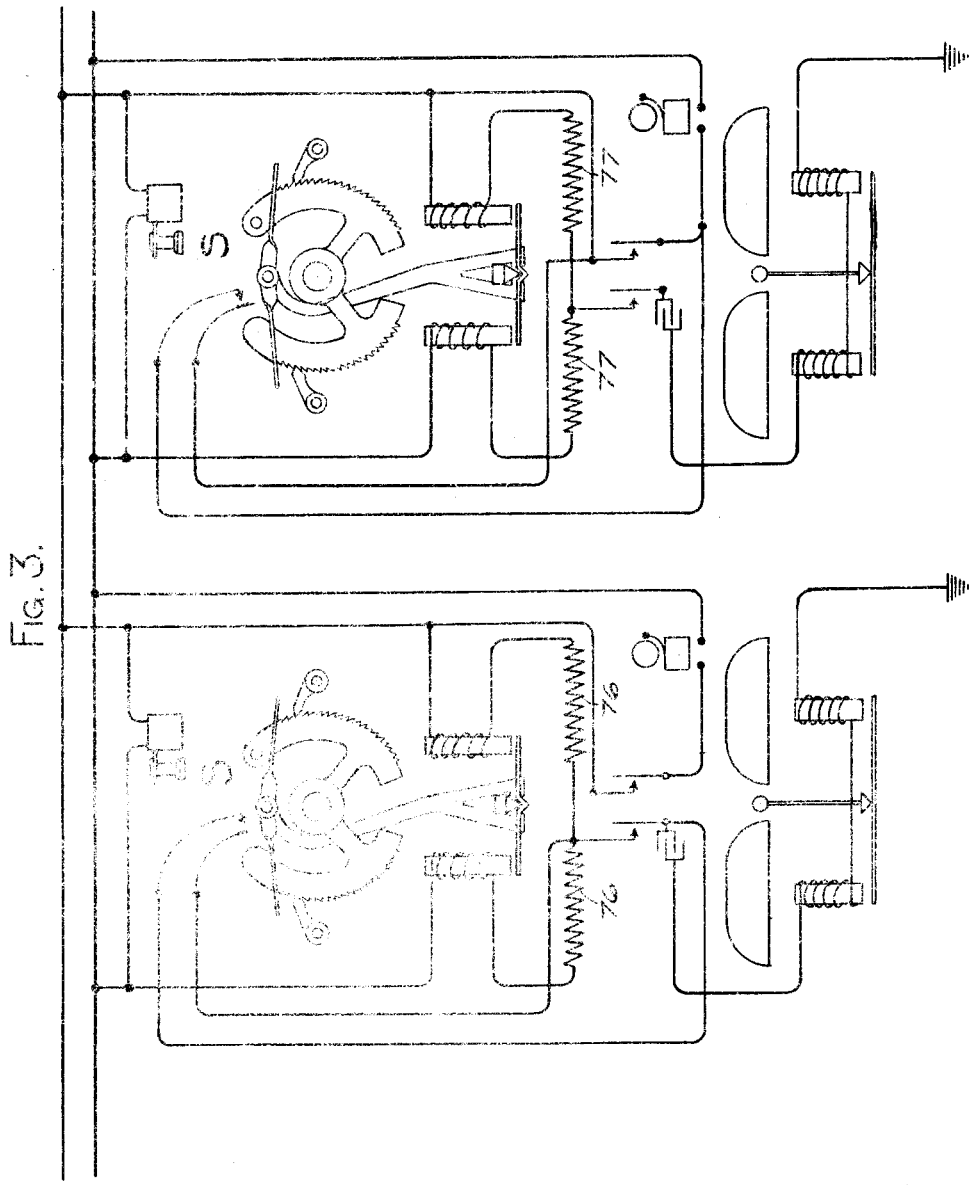

MAURICE F. GEER AND RICHARD C. LEAKE, OF ROCHESTER, NEW YORK, ASSIGNORS TO GENERAL RAILWAY SIGNAL COMPANY, OF GATES, NEW YORK, A CORPORATION OF NEW YORK.

SELECTIVE CALLING SYSTEM.

1,119,692.   Specification of Letters Patent.   Patented Dec. 1, 1914.

Application filed December 30, 1910. Serial No. 600,083.

*To all whom it may concern:*

Be it known that we, MAURICE F. GEER and RICHARD C. LEAKE, citizens of the United States, and residents of the city of Rochester, in the county of Monroe and State of New York, have invented a new and useful Selective Calling System, of which the following is a specification.

This invention relates to a system which enables an operator at a central point to selectively call any one of a number of remote stations by the use of only two line wires, such a system is in the electrical art called a selective calling system.

The primary object of the invention is to so construct and arrange a system of the character described that all electrical energy needed for the operation of the system can be supplied from the central station.

A further object of the invention is to so arrange the system that the ultimate source of energy used in the system shall be a source of low potential current which, before being impressed upon the line wires to operate the selector device will, by means of a motor generator set or similar apparatus be translated into a current of potential sufficiently high to properly operate the selectors at the remote stations, thus permitting the employment of a small number of cells of battery at the central station with the consequent diminution of the total deterioration which would take place in the cells of battery at the central station.

A further object of the invention is to so arrange the system that the current supplied from the ultimate source used in the system will be of low potential, but by means of a translating device, such as a motor generator, it will be changed into a current of greater potential and it is an important object of this invention to so arrange the above mentioned units that any desired potential may be derived from the motor generator.

A further object of the invention is to so construct the system that direct current may be used to operate the selectors at the remote stations, but either alternating or direct current may be used to cause the alarm to sound.

A further object of the invention is to so construct a system of the character described that a primary or secondary battery may be used to supply energy to the system, but the current therefrom will be translated into a direct current of higher potential than the source before being impressed on the line wires to operate the selectors and may also be converted into alternating current for sounding the alarm before being impressed on the line wires, if an alternating current bell is used.

A further object of the invention is to so construct the system that means operated by the batteries to produce direct current and alternating current will be automatically set in operation by the first act performed in making a call and will be automatically disconnected at the termination of the call.

A further object of the invention is to so arrange the direct current generator that it will automatically regulate the voltage supplied to the line wires.

A further object of the invention is to so construct the system that an answer back signal will be given at the central station when the alarm at the remote station sounds.

A further object of the invention is to so construct and arrange a system of the character described that a telephone may be permanently connected across the line wires at the remote stations and that no means will be required to disconnect it during a period of call.

A further object of the invention is to simplify the arrangements and constructions used in a system of the character described and at the same time increase the reliability and decrease the expensiveness of the same.

Other objects and advantages will appear in the description of the system and its mode of operation and the novel features of the system will be particularly pointed out in the appended claims.

The invention consists in the combinations, arrangements and constructions herein shown, described and claimed.

At the present time there are two general methods in use for operating selective signaling systems, distinguished one from the other by the mode of supplying electrical energy for the operation of the system. The first method, called the "local energy system," employs batteries located at each station where a selector is located, for the purpose of supplying electrical energy for the operation of a signaling device which is caused to operate by the operation of the selector. The second method, called the "central energy system," employs no batteries at the local stations but supplies all energy needed for the operation of the system from the central station. The central energy systems may be again divided into three classes, the first of which employs a battery at the central station for the purpose of supplying electrical energy; the second of which employs a continuously running generator, such as a dynamo or rotary converter for supplying electrical energy; the third of which employs a generator of some description which is started before a call is made, and stopped after the call is made. If primary batteries are used in either of these systems, a large expense for maintenance arises, for, whether in use or at rest, a primary battery constantly deteriorates and it has been found that both the local energy systems and the central energy systems employing primary batteries, are exceedingly expensive and of the two, the local energy system is the more expensive. If secondary batteries are used, the expense of maintaining the batteries should be decreased, but on the other hand, when secondary batteries are used, a large initial outlay is needed to install charging apparatus therewith, and a further constant expense for the services of a skilled attendant to attend the batteries, so that the substitution of secondary batteries for primary batteries in a local energy system, although giving more satisfactory results as far as operation is concerned, is really more expensive than the use of primary batteries. In central energy schemes, secondary batteries have been substituted for primary batteries with much better results, but due to the fact that a comparatively high voltage must be impressed upon the line wires of the system at the central station a large number of batteries must be installed, which necessitates a very large initial outlay and because of the fact that the amount of current required to operate the system is very slight, the batteries are not discharged often enough to keep them in good condition, so that they deteriorate more rapidly than is sanctioned by good engineering practice.

If a generator is used in the central energy systems, it must be of such a type and be designed so rugged, that it may be run continuously 24 hours of the day and every day in the year, which, to one skilled in the art means almost an impossibility, so that it is readily understood that duplicate apparatus must be installed which, of course, necessitates a very large initial outlay. If a rotary converter is used, operated by current derived from a commercial line, duplicate apparatus does not entirely solve the difficulty for the means to furnish current to the line may also fail. It has also been found that in such a system, the continuously running apparatus must have skilled attention, and as the ordinary operator employed in a selective signaling system does not have the necessary skill, some other person must be employed to care for the apparatus, thus increasing the cost for maintenance.

Systems employing an intermittently running generator would seem to be the most practical method of operating a selective signaling system, but in practice such systems have been found to be more objectionable than any of the others, for in making a call, employing such a system, three operations are necessary, first: the generator must be started and allowed to obtain sufficient speed to generate sufficient voltage; second: the call must be sent, and third: the generator must be stopped. In practice it has been found that the first step is very often neglected and as a consequence much loss of time ensues and tempers are not improved, and it has also been found that unless strict watch is kept upon the operators they will neglect to stop the generator after the call has been made in order to do away with the necessity of starting the generator before the next call. When such "tricks" are resorted to, the system and apparatus suffers severely for the generator not being designed to run continuously, soon wears out and has to be replaced, and furthermore, the cost for electrical energy is very greatly increased so that it approaches very closely to those systems using the continuously running generator. Another difficulty with this system, when the generator is allowed to run continuously, arises from the fact that the generator not being designed to run continuously and therefore not furnished in duplicate, as soon as it wears out or breaks down, throws the entire system out of operation.

As a general conclusion it may be said that it has been found to be desirable in systems designed for continuous uninterrupted operation where electrical energy is employed to, if possible, depend in the last instance upon batteries.

In the case of systems governing the movements of trains, which must act uninterruptedly and continuously all of the time, it has been found by experience extending over a long period of time, that for continuous and uninterrupted operation, reliance had best be placed upon batteries for furnishing electrical energy and for the same reason, a selective system which must also operate continuously and uninterruptedly, should depend for its source of energy upon batteries, but at the same time the number of batteries should be such that they will be obliged to furnish sufficient current to keep them in proper condition. Applicants have, therefore, devised a system of selective signaling of such a character that batteries will be depended upon for a supply of electrical energy and the batteries are employed in such number as to be economical. In applicants' system, however, a means have been provided whereby the neglect of an operator to start the motor generator used to supply current before impulses are attempted to be sent to the line is avoided and further means are provided whereby the motor generator is automatically stopped by the completion of the transmission of the current impulses, thus entirely obviating all of the objections mentioned to heretofore devised systems.

In describing the invention in detail reference is had to the accompanying drawings, wherein like reference characters denote corresponding parts through the several views, in which:

Figure 1 is a diagram illustrating the wiring of the devices on the switch board and the wires leading therefrom. Fig. 2 is a diagram illustrating the wiring at the operator's key, the line wires and one remote station connected therewith, Fig. 2 being a continuation of Fig. 1. Fig. 3 is a diagram illustrating the wiring at other remote stations, being a continuation of Fig. 2.

*Construction.*—1 and 2 designate any suitable type of battery, being considered herein as secondary batteries; 3 and 4 designate wires connected to a suitable supply of energy for charging secondary batteries 1 and 2, the system being so arranged that when one battery is being charged the other battery is used to furnish current to the system and vice versa; 5 and 6 designate double pole two throw switches which are used to connect and disconnect the batteries 1 and 2 with the charging lines 3 and 4, the switch 5 in the position shown connecting wire 7 from one pole of battery 1 to wire 3 and wire 8 from the other pole of the battery 1 with wire 4, thus causing the battery to be charged. At the same time switch 6 connects the battery 2 by means of wires 9, 10, 11, coil 12, and wire 13 to the contact spring 14 at the transmitting key, and by means of wires 8 and 15 with the contact spring 16. If the switches 5 and 6 are reversed one pole of battery 1 would be connected by means of wire 7, switch 5, wires 10 and 11, coil 12 and wire 13 to contact spring 14 and the other pole of the battery would be connected through wires 8 and 15 to contact spring 16. With the switches 5 and 6 in the last described position current from charging wire 4 would pass by means of switch 6 to wire 8 and so to battery, the other pole of the battery being connected by wire 9 and switch 6 with the other charging wire 3. It is thus seen that while one battery is charging, the other is connected to the transmitting key, and vice versa, but if occasion demands both batteries may be connected in multiple to the transmitting key by throwing both switches 5 and 6 to the right, the circuit for battery 2 being as shown in Fig. 1, and heretofore described, the circuit for battery 1 being as heretofore described with switch 5 thrown to the right to connect battery 1 with the transmitting key; 18 designates a relay having an armature 19 which bridges contacts 20 and 21 when the coil 12 is energized and the armature 19 is drawn upwardly. In such position with switches 5 and 6 in the position shown a complete circuit is formed as follows: one pole of battery 2, wire 9, switch 6, wires 10 and 11, contact 20, armature 19, contact 21, wire 22 to the motor M, passing in multiple through the armature 24 and field coil 25, uniting again and by wires 26 and 8 connecting with the other pole of the source 2. The motor armature 24 has on the same shaft with it the armature 27 of a direct current generator G, which has a field 28 connected to wire 22 the other end of the field being connected by wire 29 to a rheostat 30, the movable arm of the rheostat being connected to wire 31, which wire connects with wire 8 and so to the other pole of the battery. Wire 22 always conveys the current to motor M and the field coil 28 of generator G for if switch 5 is thrown to the right to connect battery 1 to the transmitting key and switch 6 is thrown to the left to charge battery 2, then current from battery 1 can flow through wire 7, switch 5 and wire 10 to wire 11, contact 20, armature 19, contact 21 and wire 22; 32 designates a field coil on the generator, the two wires 33 and 34 connecting to the armature brushes and running to the transmitting key. On the same shaft with armatures 24 and 27 are collector rings 35. These collector rings are connected in the well known manner to the two ends of the wire wound on armature 27, so that while direct current may be obtained from brush 33 and the brush to which wire 34 is connected, alternating current may be obtained from rings 35. By means of wire 37 and wire 38 through the condensers 40 one collector ring may be connected to both wires 33 and 34, and by means of wire 41 the other collector ring may be connected to ground 42; 43 designates any suitable electrical signal device in series with wires 37 and 38.

V designates a voltmeter one side of which is connected to the wire 8 common to both batteries, the other side of which is connected to a switch arm 44 adapted to make connection with either contact 45 or 46. Contact 46 by means of wire 47 and wire 7 is connected to battery 1, while contact 45 by means of wire 48 and wire 9 is connected with battery 2, so that by placing arm 44 on one or the other of contacts 45 and 46 the voltage of either of the batteries may be determined.

The wires 33 and 34 are connected to metallic strips on an insulating disk in a transmitting key T, fully shown, described and claimed in applicants' co-pending application Serial No. 598,673 filed December 22nd, 1910.

Wires 49 and 50 lead from the metallic strips on the insulating disk to contact springs 51 and 52 respectively, which in the manner fully shown and described in the above mentioned application are contacted at times by springs 53 and 54 to connect wires 49 and 50 with line wires 55 and 56 respectively.

S designates a selector device such as is shown described and claimed in applicants' co-pending application Serial No. 596,252, filed December 8, 1910, in which 58 and 59 designate the revoluble sectors actuated by means of armature 60 and arm 61 and dogs 62 and 63 to close contact between wire 64 and spring contact 65 and also between wire 76 and contact 77 at the same time if desired, as fully set forth in the above mentioned application Serial No. 596,252; 66 and 67 designate the coils on the cores 68 and 69 which when a current is passed therethrough energizes cores 68 and 69 to oscillate armature 60; 70 designates a non-inductive resistance by which the coils 67 and 66 are connected and which regulates the amount of current which can flow through the selector; 64 designates a wire connected to the middle point of resistance 70, which by means of contact spring 65 wire 71, condenser 72 and wire 73 is connected to an alternating current bell B, the other side of the bell being connected to the ground at 42; 74 designates two springs forming the means for an all stations call as fully set forth in my above mentioned application, being connected in multiple across the normally open break between wire 64 and contact spring 65 or across the normally open break between wire 76 and contact 77, as shown at the right hand of Fig. 3; 75 designates a telephone connected across the line wires 55 and 56 by means of which communication is had with the central station.

Fig. 3 simply illustrates an extension of wires 55 and 56 showing two more remote stations connected across the line wires the only difference being that the resistances 76 and 77 are different in ohmic resistance from each other and from resistance 70 in order to compensate for line losses, the station most distant from the transmitter having the smallest resistance.

*Operation.*—When an operator desires to call any one of the stations at which the selectors S are placed, he first pushes a button which makes contact between wire 14 and spring 16 and simultaneously predetermines the number of impulses of one polarity which will be sent to line wires 55 and 56, and also unlocks the arm of the transmitter so that it may be turned in a manner fully shown and described in applicants' co-pending application heretofore mentioned Serial No. 598,673. The making of the contact between wire 14 and contact spring 16 sends a current through the coil 12 from the battery 2 by virtue of the circuit heretofore described and causes a current from the battery 2 to pass through the motor M by a circuit heretofore described thus causing the motor armature to rotate and as the armature 27 of the generator G is connected to the same shaft as the armature 24 of motor M it also rotates, and as the field 28 is energized from the battery 2 at the same time that motor M is caused to rotate a current is generated in the armature 27 of the generator G, which passes to wire 33 and through the field coil 32 connected therewith to the transmitting key, wire 34 connecting the other pole of the generator G with the transmitting key. So that as soon as another key necessary for proper operation is depressed on the transmitter according to the manner fully explained in applicants' co-pending application, wires 49 and 50 will be connected with line wires 55 and 56 and the number of impulses of a certain polarity to be supplied to line wires 55 and 56 predetermined. A current will then pass out over one line wire through selector devices at the several stations and return by the other line wire and upon a rotation of the transmitter crank will cause the selectors at the remote stations to operate, but only one of them will so operate as to make a contact between wires 64 and spring 65 and wire 76 and spring 77. At the same time a direct current was impressed upon the line wire an alternating current was generated by armature 27 of generator G and by means of the collector ring 35 and the wires 37 and 38 was impressed upon both line wires through the condensers 40 and wires 33 and 34, and so as soon as contact is made between wire 64 and spring 65 at one of the stations the alternating current from one side of the source would pass along both line wires and from the line wires through the coils 66 and 67 of the selector, and then to the non-inductive resistance 70 passing from the central point of said resistance to wire 64 to the springs 65 through the condensers 72 to wire 73 and then through the bell B to the ground, returning to the other collector ring at the central station by the wire 41 thereby causing the bell B to ring. When contact was closed between 64 and 65 a contact was also closed between 76 and 77 which causes bell 78 to ring by the direct current on the line. Both bells would not ordinarily be used but both are shown simply to illustrate the fact that either direct or alternating current may be used to sound the alarm.

The complete movement of the arm of the transmitter automatically disconnects contacts 14 and 16 thus stopping the motor generator, and also breaks contact between contacts 51 and 53 and 52 and 54 as fully shown and described in our application, Serial No. 598,673.

It has been fully shown and described in applicants' copending application Serial Number 596,252, filed December 8th, 1910, that direct current of one polarity impressed upon line wires 55 and 56 cause the right hand end of armature 60 to be raised from its normal horizontal position, thus causing dog 62 to actuate sector 58, and it has also been shown that direct current of the reverse polarity causes the left hand end of armature 60 to be raised and thus dog 63 and sector 59 to be actuated as armature 60 is polarized. It has further been shown that a proper combination of impulses in the two directions will so actuate the sectors 58 and 59 as to close contact between springs 64 and 65 and 76 and 77. In application Serial Number 598,673, heretofore referred to it has been fully shown and described how the transmitter by the revolution of the arm attached thereto causes a predetermined number of impulses to be sent to the line in one direction and then automatically thereafter causes a predetermined number to be impressed upon the line of reverse polarity and also how thereafter a single impulse of the same polarity as the first impulses, is impressed upon the line to hold the selector S in such a position that contact will be closed between springs 64 and 65 and 76 and 77, and how at the same time the alternating current from brush 36 flows through both line wires as a multiple circuit to and through the selector at the called station without affecting it through contacts 64 and 65 to bell B and to ground, returning by the ground to the transmitter station and thence by wire 41 to the other brush 23 bearing on the other collector ring.

If the operator at the central station desires to call all remote stations simultaneously, he would send out such number of impulses of the proper polarity as would cause the sector 58 to be rotated farther than it would be rotated by any combination of impulses used to operate the selectors for individual call. It would therefore make contact between the springs 74 closing a bridging connection around wire 64 and contact spring 65, and ring the bell B, or if the bell 78 only were used, the springs 74 would be connected in multiple across the break 76 and 77 as shown at the right hand of Fig. 3, and so cause bell 78 to ring. It is to be observed that the connection of one pole of the source of alternating current to both line wires through the condensers 40 does not short circuit the line wires, as it is impossible for direct current to pass through the condensers 40. It is also to be observed that the direct current which operates the selectors at the different stations cannot pass through the bells B at the several stations by means of the condenser 72 in series with the bell, as direct current cannot pass through the said condensers although alternating current readily passes there-through. It is also to be observed that the resistances 70, 76 and 77 must be wound noninductively, for if they are not so wound it would be impossible for alternating current to flow through said resistances in order to actuate the bells B at the several stations.

We wish it to be understood that we do not desire to be limited to the exact details of construction shown and described, for obvious modifications will occur to a person skilled in the art.

Having particularly described the construction of one embodiment of our invention and explained the operation and principle thereof, what we claim as new and desire to protect by Letters Patent is:—

1. In a selective calling system, normally deënergized conductors, a source of low potential current, a rotary converter, a normally open circuit connecting said source and the motor part of the converter, a transmitting device electrically connected to the generator part of the rotary converter and to the conductors, a selective device governed by the transmitting device through the conductors and an alarm device governed by the selective device, means included in the transmitter whereby the operation of the transmitting device closes the said normally open circuit and thus causes the operation of the rotary converter, and the alarm device.

2. In a selective calling system, a source of low potential electrical energy, conductors, a rotary device adapted to transform said energy to a higher potential, means for connecting said device to the said conductor, said connecting means including mechanism adapted to start said transforming means and to intermittently impress said higher potential energy upon the conductors and at predetermined times change the polarity of the energy supplied to the conductors, a selector connected with said conductors, a contact closed by the action of said selector, an alarm governed by the closing of said contact and means co-operating with said parts to cause a flow of electrical energy from the rotary device to said alarm device.

3. In a selective signaling system, two conductors, a selector having coils connected in series bridged across said conductors, contacts operated by said selector, an indicator having two terminals one of which is connected to one of said contacts, the other of said contacts joined to the connection between said coils, another conductor, the other terminal of said indicator connected to said other conductor, sources of both alternating and direct current, means to connect said first mentioned conductors with said source of direct current, and both of said first mentioned conductors with one terminal of said source of alternating current, said other conductor being connected to the other terminal of the source of alternating current.

4. In a selective signaling system, a source of low potential current, a transforming device adapted to at times transform the low potential current into a higher potential current, a central station and substations, conductors connecting the central station with the substations and the substations with each other, selectors at each of said stations except the central station connected to said conductors, each of said selectors comprising a contact adapted to be closed when the selector bearing it is suitably operated, an indicator at each of said substations, and means at the central station adapted for setting said transforming device into operation and selectively operating said selectors, thereby closing said contact, a circuit closed by said contact including said transforming device for supplying said indicator with energy from the central station to cause the indicator to indicate.

5. In a selective signaling system, two line wires, a return conductor, selectors in multiple circuit with the line wires, contacts operated by the selectors, indicators in series circuit with the contacts and in multiple with both line wires and the return conductor, a normally inactive source of alternating current and of direct current, and means to cause said source to become active, break the direct current into predetermined impulses and allow it to flow to said selectors thereby selectively operating said contacts to allow said alternating current to flow through one of said indicators.

6. In a selective signaling system, a source of current, a converter connected to said source in a normally open circuit, said converter having a motor side and a generator side, the generator side having both collector rings and a commutator, a transmitter including means for closing and opening said normally open circuit, two line wires, wires connected to the commutator through the transmitter to the line wires, a selector connected across the line wires, said selector having contacts adapted to be closed when said selector is selectively operated, a return conductor, an indicator having one terminal connected through said contacts to both of said line wires, the other terminal of said indicator connected to said return conductor, condensers, one of said collector rings connected through the condensers to both of said first mentioned two wires.

7. In a selective signaling system, a source of current, a converter connected to said source in a normally open circuit, said converter having a motor side and a generator side, the generator side having both collector rings and a commutator, a transmitter including means for closing and opening said normally open circuit, line wires, two wires connected to the commutator through the transmitter to the line wires, a selector connected across the line wires, said selector having contacts adapted to be closed when said selector is selectively operated, a return conductor, an indicator having one terminal connected through said contacts to both of said line wires, the other terminal of said indicator connected to said return conductor, condensers, one of said collector rings connected through the condensers to both of said first mentioned two wires, a signal device in series with said condensers and collector ring, the other of said collector rings connected to said return conductor.

8. In a selective signaling system, a source of current, a selector, a contact operated by the selector, an indicator controlled by the contact, a normally inactive converter arranged to generate both direct current and alternating current, means whereby the converter is connected to the source of current thereby causing the generation of both alternating and direct current, means for causing the direct current to flow to the selector thereby actuating it, and operating the contact, a circuit completed by the operation of the contact whereby the alternating current flows to the indicator thereby actuating it.

9. In a selective signaling system, a source of current, a selector, a contact operated by the selector, an indicator controlled by the contact, a normally inactive motor generator, means whereby the motor generator is connected to the source of current thereby causing the generation of current, means for causing the generated current to flow to the selector thereby actuating it and operating the contact, a circuit completed by the operation of the contact whereby the generated current flows to the indicator thereby actuating it.

10. In a selective calling system, normally deënergized conductors, a source of current, a converter, a normally open circuit connecting said source and converter, a transmitting device electrically connected to the converter and to the conductors, a selective device governed by the transmitting device through the conductors and an alarm device governed by the selective device, and means operating in unison with the transmitter, adapted to close and open said normally open circuit, all so arranged that the operation of the transmitting device causes the operation of the converter and the alarm device.

11. In a selective calling system, normally deënergized conductors, a source of current, a converter, a normally open circuit connecting said source and converter, a transmitting device electrically connected to the converter and to the conductors, a selective device governed by the transmitting device through the conductors and an alarm device governed by the selective device, and means operated in unison with the transmitter to govern the normally open switch to cause the converter to start and stop.

MAURICE F. GEER.
RICHARD C. LEAKE.

Witnesses:
LILLIAN L. PHILLIPS,
MARY G. DALBEY.